(12) United States Patent
Wendt et al.

(10) Patent No.: US 11,093,021 B2
(45) Date of Patent: Aug. 17, 2021

(54) POWER MANAGEMENT METHOD AND DEVICE FOR DC POWERED DEVICE ARRANGEMENT

(71) Applicant: SIGNIFY HOLDING B.V., Eindhoven (NL)

(72) Inventors: Matthias Wendt, Eindhoven (NL); Eduard Gerhard Zondag, Eindhoven (NL); Harald Josef Günther Radermacher, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 95 days.

(21) Appl. No.: 16/322,989

(22) PCT Filed: Jul. 24, 2017

(86) PCT No.: PCT/EP2017/068620
§ 371 (c)(1),
(2) Date: Feb. 4, 2019

(87) PCT Pub. No.: WO2018/024524
PCT Pub. Date: Feb. 8, 2018

(65) Prior Publication Data
US 2019/0179402 A1    Jun. 13, 2019

(30) Foreign Application Priority Data

Aug. 4, 2016 (EP) ..................... 16182757

(51) Int. Cl.
*G06F 1/26* (2006.01)
*G06F 1/32* (2019.01)
(Continued)

(52) U.S. Cl.
CPC ............ *G06F 1/3287* (2013.01); *G06F 1/266* (2013.01); *G06F 1/3206* (2013.01);
(Continued)

(58) Field of Classification Search
CPC ...... G06F 1/266; G06F 1/3206; G06F 1/3287; G06F 1/3296; H04L 12/10; H04L 12/12; H04L 12/40045; Y02D 50/40
See application file for complete search history.

(56) References Cited

U.S. PATENT DOCUMENTS 8,892,915 B2    11/2014   Hua et al.
8,943,344 B2    1/2015    Giat
(Continued)

FOREIGN PATENT DOCUMENTS

| EP | 2701338 A1 | 2/2014 |
| WO | WO2016005256 A1 | 1/2015 |
| WO | WO2015106992 A1 | 7/2015 |

*Primary Examiner* — Nitin C Patel

(57) ABSTRACT

Power management (203) for controlling a delivery of a DC-power to a device (204) operable in an accepting operational state or a non-accepting operational state with respect to receiving the DC-power comprises: receiving DC input power; providing an indication that the DC-power supply device (202) operates in a powered-device detection mode and not in an powered-device operation mode; connecting, when the DC-power supply device (202) is in the powered-device detection mode, the power to an energy storage unit (212); storing electrical energy currently received; determining, whether the power-acceptance criterion is fulfilled and, in case it is fulfilled, providing an instruction to operate in the accepting operational state; connecting the energy storage unit (212) and a power interface unit (206) when the external DC-power supply device (202) is currently operating in the powered-device operation mode. This reduces DC-power consumption of a DC-powered device (204) by reducing or eliminating its DC-power consumption while it is operating in the non-accepting operational state.

11 Claims, 5 Drawing Sheets

(51) Int. Cl.
*G06F 1/3287* (2019.01)
*G06F 1/3206* (2019.01)
*G06F 1/3296* (2019.01)
*H04L 12/10* (2006.01)
*H04L 12/28* (2006.01)
*H04L 12/40* (2006.01)
*H04L 12/12* (2006.01)

(52) U.S. Cl.
CPC ............ *G06F 1/3296* (2013.01); *H04L 12/10* (2013.01); *H04L 12/12* (2013.01); *H04L 12/2816* (2013.01); *H04L 12/40045* (2013.01); *Y02D 30/50* (2020.08)

(56) References Cited

U.S. PATENT DOCUMENTS

| | | | |
|---|---|---|---|
| 2010/0078992 A1* | 4/2010 | Landry | H03K 17/18 307/2 |
| 2012/0060042 A1* | 3/2012 | Buhari | G06F 1/266 713/320 |
| 2013/0111245 A1 | 5/2013 | Giat | |
| 2014/0053011 A1 | 2/2014 | Diab | |
| 2015/0106638 A1 | 4/2015 | Sun et al. | |
| 2016/0334856 A1* | 11/2016 | Yseboodt | G06F 1/3206 |

* cited by examiner

POWER MANAGEMENT METHOD AND DEVICE FOR DC POWERED DEVICE ARRANGEMENT

CROSS-REFERENCE TO PRIOR APPLICATIONS

This application is the U.S. National Phase application under 35 U.S.C. § 371 of International Application No. PCT/EP2017/068620, filed on Jul. 24, 2017, which claims the benefit of European Patent Application No. 16182757.1, filed on Aug. 4, 2016. These applications are hereby incorporated by reference herein.

FIELD OF THE INVENTION

This invention relates to a power management device, to an electrical arrangement and to a method for operating a power management device.

BACKGROUND OF THE INVENTION

U.S. Pat. No. 8,892,915 B2 discloses a method and apparatus of power over Ethernet. An Ethernet DC-power supply device, also known in the field as power sourcing equipment (PSE), sets a power supply port to a sleep state, sets a timer for the power supply port, enables the power supply port when the timer reaches the set time, and detects—while operating in a powered-device detection mode—whether a DC-powered device (PD) is connected to the power supply port. If the PD is connected to the power supply port, the PSE triggers a powered-device operation mode during which the power supply port supplies power to the PD. If no PD is connected to the power supply port, it resets the power supply port to the sleep state, and sets the timer for the power supply port.

WO 2015/106992 A1 relates to a power distribution system, such as a Power over Ethernet power distribution system. A powered device provides a pulse, such as a Maintain Power Signature, when in standby such that a power providing device remains providing power to it. To increase energy efficiency, the MPS can be cycled (60 ms pulse every 300 ms to 400 ms) according to the IEEE 802.3 af/at standards. By introducing a controllable switch, for electrically decoupling at least part of the powered device from the power providing device, and a pulse generator, the MPS can be generated in a more energy efficient way and/or can be shortened (e.g. to 5 ms). As an example, the controllable switch can decouple the bulk capacitor of the powered device during MPS generation to prevent the bulk capacitor from filtering out the MPS.

SUMMARY OF THE INVENTION

To keep a DC-powered device powered for a minimal standby functionality, a typical DC-powered device has to consume a certain amount of power, at least during operation in a powered-device detection mode. During this powered-device detection mode, the DC-power supply device provides a voltage signal and detects a signature load that is used to distinguish if there is a DC-powered device connected to the DC-power supply device, the DC-powered device being in an accepting operational state (i.e. expecting to receive DC-power from the DC-power supply).

It would be thus desirable to further reduce the DC-power consumption of a DC-powered device that is in a non-accepting operational state.

It is an object of the present invention to reduce the DC-power consumption of a DC-powered device by providing a power management device.

According to a first aspect of the present invention, a power management device for controlling a delivery of a DC-power from an external DC-power supply device, which is operable at least in a powered-device detection mode and in a powered-device operation mode that is different from the powered-device detection mode, to an external DC-powered device that is operable, in accordance with a predetermined power-acceptance criterion, in either an accepting operational state or a non-accepting operational state with respect to receiving the DC-power is presented. The power management device comprises:

a power interface unit configured to receive DC input power from the external DC-power supply device and provide DC output power to the external DC-powered device in the accepting operational state of the external DC-powered device;

a voltage-level comparison stage connected to the power interface unit and configured to deliver a switching control signal with a respective signal state indicative of a DC-voltage amount currently supplied by the DC-power supply device;

a power-acceptance decision unit which is configured to determine whether or not the power-acceptance criterion is fulfilled and, in case it is fulfilled, to provide a power-acceptance command for reception by the external DC-powered device and indicative of an instruction to operate in the accepting operational state;

a switching unit, which is configured to receive the switching control signal and to mutually connect, when the signal state of the switching control signal indicates that the DC-power supply device is currently operating in the powered-device detection mode or in the powered-device operation mode, the power interface unit and an energy storage unit that is configured to store electrical energy currently received from the external DC-power supply device via the power interface unit.

The power management device of the first aspect is thus configured to reduce the DC-power consumption of a DC-powered device connected to it, by reducing or even eliminating the DC-power consumption of the DC-powered device while it is operating in the non-accepting operational state.

The external DC-power supply device is configured to operate in several modes by providing mode-specific DC input power to the external DC-powered device via the power management device. The DC input power comprises, at each time, a corresponding voltage amount and a corresponding current amount. One of the modes in which the DC-power supply is operable in is the powered-device detection mode. In this operation mode, the DC-power supply device provides DC input power with a voltage amount belonging to a predetermined voltage value range, and expects to detect a signature load that is indicative of a connected DC-powered device being in an accepting operational state. If the expected signature load is detected, the operation mode eventually changes to the powered-device operation mode. During the powered-device operation mode, the DC-power supply device provides the DC input power necessary for the operation of the DC-powered device.

If the expected signature load is not detected (e.g., a high impedance indicative of an open circuit state is detected instead), the DC-power supply device will continue to operate in the powered-device detection mode. This continued powered-device operation mode may take place continuously or after a predetermined time lapse. In the former case, the DC-power supply device continuously determines the load connected to it and whereas in the latter case, the DC-power supply device in configured to operate in the powered-device detection mode only during predetermined lapses of time. In between those lapses of time, the DC-power supply device typically does not provide any power.

A DC-powered device operating in the accepting operational mode does not receive power from the DC-power supply device until it has been identified by the DC-power supply device as a DC-powered device being in an accepting operational state. Thus, the DC-power supply device supplies DC power to the DC-powered device only when the DC-powered device is in the accepting operational state and the DC-power supply device has detected the signature load and thus identified the connected DC-powered device as a powered-device being in an accepting operational state. The fact that a DC-power supply device is operating in a powered-device operation mode implies that the DC-powered device is in an accepting operational state.

According to the power management device of the first aspect, the voltage provided by the DC-power supply device is received at the power interface unit. The voltage-level comparison delivers a switching control signal that has a signal state indicative of the DC-voltage amount being currently supplied by the DC-power supply device.

The power management device further comprises a power-acceptance decision unit which is configured to determine whether or not the power-acceptance criterion is fulfilled. The power-acceptance criterion defines a condition sufficient and necessary for the external DC-powered device to operate in the accepting operational state, i.e. a condition indicative of a requirement of operation of the DC-powered device. The power-acceptance criterion is in some embodiments based on an external input such as, but not limited to, a signal from an external timer, from an external switch, from an external sensing device (e.g., a humidity sensor, a temperature sensor, a movement sensor, a light sensor such as a light dependent resistor, an infrared sensor, or other kinds of sensors known to the skilled in the art), etc. In other embodiments, the power-acceptance criterion is based on an input signal provided by the DC-power supply device such as a predetermined pulse or a predetermined concatenation of pulses. If the power-acceptance criterion is fulfilled, the power acceptance decision unit provides a power-acceptance command that is to be received by the external DC-powered device. The power-acceptance command is indicative of an instruction to operate in the accepting operational state.

The switching unit receives the switching control signal and it is configured to mutually connect the power interface unit with the energy storage unit, when the signal state of the switching control signal indicates that the DC-power supply device is currently operating in the powered-device detection mode or in the powered-device operation mode.

The energy storage unit is configured to store electrical energy that is received from the external DC-power supply via the power interface unit in dependence on the signal state of the switching control signal. Thus, when the external DC-power supply device operates in the powered-device detection mode, the electrical energy provided by the DC-power supply device is not consumed by the DC-powered device in the non-accepting operational state but it is stored in the energy storage unit and used to power the power-acceptance decision unit.

In the following, embodiments of the power management device of the first aspect of the present invention will be described.

In some embodiments, the power acceptance decision unit is configured to be powered directly by the electrical energy that flows through the switching unit without having to be stored first. For instance, if the decision unit requires power at the precise moment when power is being delivered during the device detection mode, it can use the power that is being delivered before it is stored in the storage unit. Hence, the energy storage unit is only required when the power required for sensing and decision needs the energy contained in multiple detection pulses after each other, and thus gets collected over a number of cycles, or when the sensing technique makes use of power available also during the pauses between the detection cycles.

In other embodiments, the power-acceptance decision unit is configured to operate under power provided exclusively by the energy storage unit. In these embodiments, the DC-powered device is advantageously designed to not consume power from the DC-power supply device while being in the non-accepting operational state. A particularly simple way to implement such a DC-powered device is to use the power-acceptance command to trigger a closure of a current loop between the DC-power supply device and the DC-powered device so that switches from presenting a very high impedance (ideally infinite) while being in the non-accepting operational state to present the expected signature load indicative of the accepting operational state when the power-acceptance command is received. In some DC-powered devices this is achieved by using a relay governed by the power-acceptance command.

The voltage provided by the DC-power supply device while operating in the powered-device detection mode is stored in the energy storage unit and then provided by the power-acceptance decision unit to determine, based on the power-acceptance criterion, if the DC-powered device is to be operated in the accepting operational state or not. Once the external DC-powered device receives the power-acceptance command and starts operating in the accepting operational state, the DC-power supply is able to detect the presence of the DC-powered device in the powered-device detection mode (due to the detection of the predetermined signature load) and starts to deliver, while operating in the powered-device operation mode, DC-power for the operation of the DC-powered device. During the operation in the powered-device operation mode, the switching unit also mutually connects the power input interface and the energy storage unit so that the powering of the power-acceptance decision unit is guaranteed.

Some embodiments of the power management device are configured to be used in a Power over Ethernet system comprising at least an external DC-power supply device (also known as power sourcing equipment, PSE) and an external DC-powered device. The power-acceptance decision unit is in this case powered, during operation in powered-device detection mode, by the electrical energy harvested from the pulses generated by the PSE in timed cycles as described for example in the IEEE 802.3 standard.

In some embodiments, the determination of whether the DC-power supply is operating in the powered-device operation mode or not, is performed in the voltage-level comparison stage. In these embodiments, the voltage-level comparison is additionally configured to determine if the current voltage level of the DC-power input is higher than an operational voltage threshold that is indicative of the DC-power supply device operating in the powered-device operation mode. In these embodiments, the switching unit is further configured to mutually connect the power interface unit and the energy storage unit when switching control signal is indicative of the current voltage level of the DC-power input being higher than the operational voltage threshold. Therefore, in these embodiments, the voltage level comparison stage is further configured to determine if the DC-power supply device is operating in the powered-device operation mode by determining if the current voltage level of the DC-power input is higher than the operational voltage threshold that is indicative of the DC-power supply device operating in the powered-device operation mode. If it is determined that the DC-power supply device is currently operating in the powered-device operation mode, the switching unit of these embodiments is configured to mutually connect the power interface unit and the energy storage unit. The operational voltage threshold is indicative of power being delivered from the DC-power supply device to a DC-powered device in an accepting state, and it is higher than the upper limit of a predetermined voltage range that is indicative of the DC-power supply device operating in the powered-device detection mode and not in the powered-device operation mode. In some embodiments that comply with the Power over Ethernet standard, the operational voltage threshold is at least 36 volts.

In other embodiments, the switching unit is further configured to receive the power-acceptance command and to mutually connect the power interface unit and the energy storage unit upon receiving the power-acceptance command. In these embodiments, the DC-input power is only monitored by the voltage-level comparison stage to determine if the DC-powered device is currently operating in the powered-device detection mode and not if it is operating in the powered-device operation mode. In these embodiments, however, the power-acceptance command is also received by the switching unit and it is used to control the switching unit to mutually connect the power interface unit and the energy storage unit upon reception of the power-acceptance command. The reception of the power-acceptance command is a sign that implies that the DC-powered device is currently in the accepting state and thus is either receiving DC-power from the DC-power supply device or will receive power after the DC-power supply device detects the signature load that the DC-powered device is currently presenting and that is indicative of the accepting operational state. In these embodiments, the power interface device and the energy storage unit are not only mutually connected when the DC-power supply is operating in the powered-device detection mode or the powered-device operation mode but also at the times where the DC-powered device is in the accepting operational state but the DC-power supply device is not operating in the powered-device operation mode. This may happen when the power-acceptance command is sent to the switching unit and to the DC-powered device but the DC-power supply device is still operating in the powered-device detection mode, i.e. it has not yet identified the DC-powered device as a powered device in an accepting operational state.

Some of these embodiments comprise a switching unit having a single switch being controlled by two different signals (e.g. the switching control signal and the power-acceptance command), while other power management devices comprise a switching unit including two different switches being controlled respectively by the switching control signal and the power-acceptance command.

In some embodiments, when the power-acceptance criterion is not currently fulfilled, the power-acceptance decision unit is further configured to provide a power-discontinuation command for reception by the external DC-powered device and indicative of an instruction to operate in the non-accepting operational state. The power-discontinuation command is in some embodiments a dedicated command containing specific operational data indicative of an instruction to discontinue the accepting operational state, whereas in other embodiments the lack of a power-accepting command is understood as a power-discontinuation command.

In some embodiments of the power management, the fact that DC-input power has a current voltage amount belonging to a predetermined voltage range is indicative of the DC-power supply device operating in the powered-device detection mode. In some of these embodiments, the predetermined voltage range extends between a first reference voltage forming a lower limit and a second reference voltage forming an upper limit of the voltage range, and wherein voltage-level comparison stage comprises a first comparator configured to determine whether the current voltage level of the DC-input power is higher than the first reference voltage, and a second comparator configured to determine whether the current voltage level of the DC-input power is lower than a second reference voltage. In these embodiments the voltage-level comparison stage comprises a first comparator configured to determine whether the current voltage level of the DC-input power is higher than the first reference voltage, and a second comparator configured to determine whether the current voltage level of the DC-input power is lower than a second reference voltage. In some of these embodiments, each of the first and second comparators has a positive input and a negative input, and wherein the power interface unit is connected to the positive input of the first comparator and to the negative input of the second comparator, the first reference voltage is provided to the negative input of the first comparator and the second reference voltage (higher than the first reference voltage) is provided to the positive input of the second comparator. These embodiments comprise a particularly advantageous voltage comparison stage, from the point of view of the electrical implementation. This particularly simple voltage-level comparison stage enables a setting of the predetermined voltage range indicative of the DC-power supply device being operated in the powered-device detection mode. If the current voltage level of the DC-input power is higher than the first reference voltage amount and lower than the second reference voltage amount, a corresponding switching control signal is provided that will cause the switching unit to mutually connect the power interface unit with the energy storage unit.

In some embodiments, the first reference voltage and the second reference voltage amounts comply with the current Power over Ethernet Standards and have values equal to or higher than 8 volts and equal to or lower than 12 volts respectively.

In some embodiments, the power-acceptance decision unit is further configured to receive a wake-up signal from an external control unit and to determine whether or not the power-acceptance criterion is fulfilled in dependence on a signal state of the wake-up signal. The external control unit thus provides the wake-up signal upon determining that a predetermined condition has been met, that requires the DC-powered device to operate in a power accepting operational state. The external control unit can be a sensing device, a switch, a microprocessor, a timer, a charge checking circuit, etc. These embodiments are advantageously configured to use a current state of a given variable as determined by the external control unit to steer the operation of the DC-powered device. In a particular set of embodiments, the wake-up signal is delivered by a charge checking circuit configured to determine whether or not the amount of charge of an energy storage device is below a predetermined charge level threshold. In case the current amount of charge lies below the predetermined charge level threshold, the power-acceptance command is delivered to the external DC-powered device that is in these cases the energy storage device. The energy storage device is, in different embodiments, a super-capacitor, a rechargeable battery, a chargeable fuelcell system or other known energy storage devices. In other embodiments, the DC-powered device is a luminaire and the power acceptance criterion is based on the actual state of a switch or of a sensor such as a movement sensor, an infrared sensor, an ambient light sensor, etc.

In other embodiments, the power-acceptance decision unit comprises an event monitoring unit that is connected to the power interface unit and configured to keep count a number of occurrences of a predetermined event, and wherein the power-acceptance criterion is fulfilled when the counted number of occurrences reaches a predetermined threshold amount. The predetermined event is in some embodiments an occurrence of an internal pulse in the event monitoring unit produced by, for example, an internal clocking unit. In other embodiments the event monitoring unit is configured to count voltage pulses or concatenation of voltage pulses provided by the DC-power supply device via the power interface unit. This is particularly advantageous in Power over Ethernet systems, where the DC-power supply device is configured to provide a DC-voltages pulse during its operation in the powered-device detection mode. In case no DC-powered device in the accepting operational state is detected, the DC-power supply is configured to repeat the provision of the DC-voltage pulse after a predetermined time lapse. Therefore, these embodiments enable the switching of the operational state of a DC-powered device from the non-accepting operational state (and thus not detectable during the operation in the powered-device detection mode) into the accepting stage after a predetermined time has lapsed, which can be set by the setting a predetermined threshold amount of pulse occurrences accordingly. In some embodiments, the counted number of occurrences is reset to zero when the DC-powered device changes from the accepting operational state to the non-accepting operational state. In some of these embodiments, the event monitoring unit is also configured to operate under power provided additionally or even exclusively by the energy storage unit. In some of these embodiments, the power accepting decision unit is further configured to operate in two distinct operational modes, namely a calibration mode, and an operative mode. While operating in the calibration mode, the event monitoring unit keeps track of the number of occurrences of a predetermined event, such as pulses form an internal clocking unit or pulses received from the DC-power supply device until the power-acceptance criterion is fulfilled. In the operative mode, the power-acceptance criterion is solely based on the number of occurrences tracked during the operation in the calibration mode.

In other embodiments the DC-voltage pulses provided by the DC-power supply device during operation in the powered-device detection mode are used as a timing reference signal for a programmable event monitoring unit. The power acceptance decision unit is in these embodiments configured to provide the power acceptance command once the counted number of DC-voltage pulses has reached the predetermined threshold amount. Thus, knowing the frequency value at which these pulses are provided, which in the case of Power over Ethernet technology is defined in the IEEE 802.3 standard, it is technically simple to implement a timer configured to command a DC-powered device in a non accepting operational state to change its state into the acceptance operational state after a desired time amount has lapsed.

According to a second aspect of the present invention, an electrical arrangement is presented. The electrical arrangement comprises a power management device of the first aspect of the invention, and at least one DC-powered device connected to the power management device. The DC-powered device is operable, in accordance with a predetermined power-acceptance criterion, in either an accepting operational state or a non-accepting operational state with respect to receiving the DC-power and is configured to receive the DC output power and the power-acceptance command from the power management device and wherein the DC-powered device is configured to operate in a power acceptance operation mode upon reception of the power-acceptance command.

In the following, embodiments of the second aspect of the present invention will be described.

In some embodiments, the electrical arrangement further comprises a control unit to deliver a wake up signal to the power-acceptance unit upon determining that a predetermined condition has been met that requires the load to operate in a power accepting operational state, the reception of the wake up signal by the power-acceptance decision unit forming the power-acceptance criterion. This means that the reception of the wake up signal fulfills the power-acceptance criterion.

In some of these embodiments, the control unit comprises a user interface unit that is configured to deliver the wake up signal in dependence on a predetermined user input. By interacting with the user interface unit, a predetermined user input causes the delivery of the wake-up signal to the power-acceptance decision unit, and thus change the operational state of the DC-powered device. The user interface unit is in different embodiments a switch that is operable by the external user, a sensing device that senses changes in its environment (temperature, movement, light conditions, physical properties of a given object, etc.), etc.

In other embodiments, the control unit is a timer unit configured to deliver the wake up signal at a predetermined point in time. These embodiments do not require a user input to deliver the wake up signal and can be programmed to deliver the wake up signal at a predetermined point time.

In other embodiments, the electrical arrangement further comprises a DC-power supply device that is configured to deliver DC-power to the DC-powered device and to the power management device.

The embodiments of the second aspect share the advantages of the power management device of the first aspect or any of its embodiments.

According to a third aspect of the present invention, a method is provided for operating a power management device in controlling a delivery of a DC-power from an external DC-power supply device to an external DC-powered device that is operable, in accordance with a predetermined power-acceptance criterion, in either an accepting operational state or a non-accepting operational state with respect to receiving the DC-power. The method comprises:

receiving DC input power from the external DC-power supply;

delivering a switching control signal with a respective signal state indicative of whether or not a current voltage level of the DC-input power falls within a predetermined voltage range that is indicative of the DC-power supply device operating in a powered-device detection mode and not in an powered-device operation mode;

providing, when the signal state of the switching control signal indicates that the DC-power supply device is currently operating in the powered-device detection mode, the DC input power to an energy storage unit;

storing electrical energy currently received from the external DC-power supply device in the energy storage unit;

determining whether or not the power-acceptance criterion is fulfilled and, in case it is fulfilled, providing a power-acceptance command for reception by the external DC-powered device and indicative of an instruction to operate in the accepting operational state;

mutually connecting, via the switching unit, the energy storage unit and the power interface unit when the external DC-power supply device is currently operating in the powered-device operation mode.

The method of the third aspect of the invention shares the advantages described in the context of the power management device of the first aspect or any of its embodiments It shall be understood that the power management device of claim 1 and the method for operating a power management device of claim 11 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
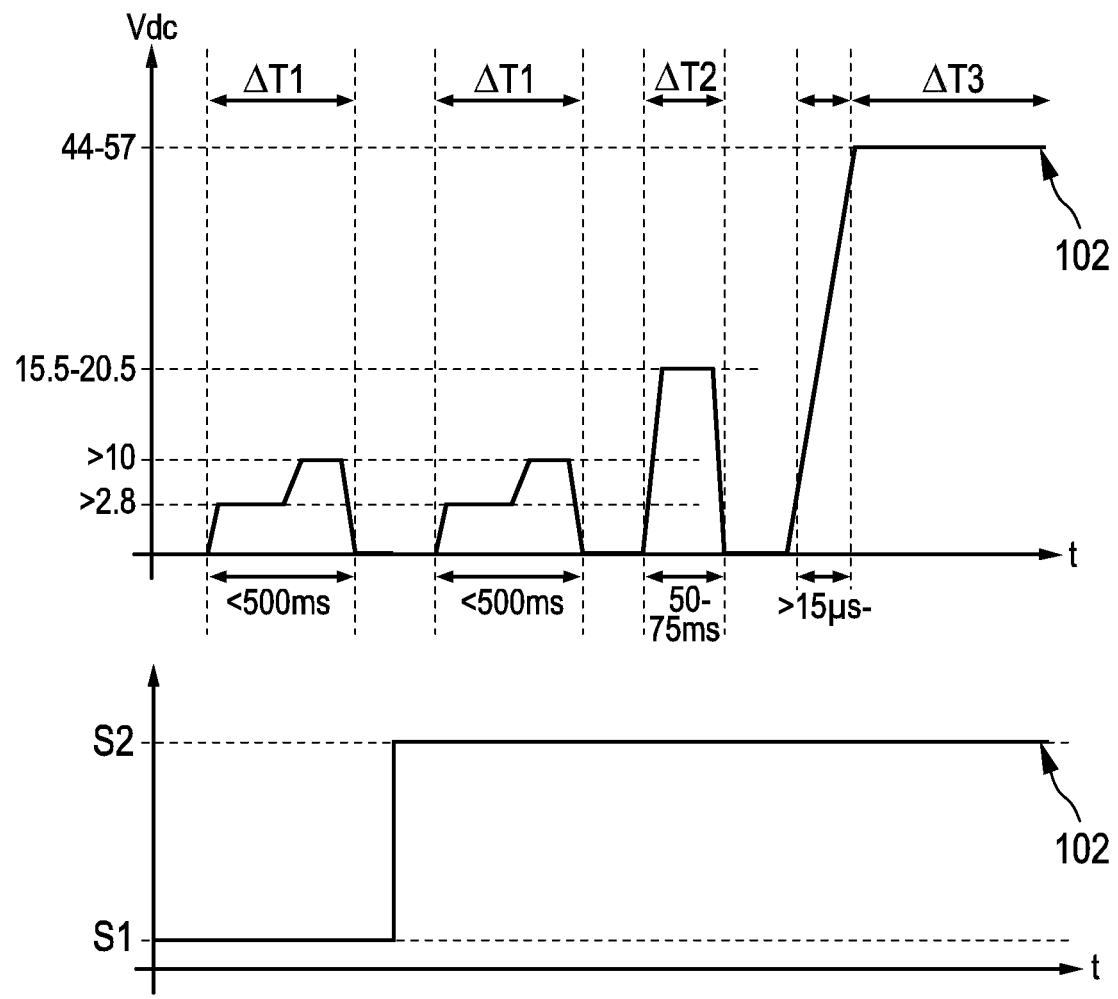
FIG. 1 shows an exemplary DC voltage signal in different operation modes in reference to an operational state of a DC-powered device.

FIG. 1 shows an exemplary DC voltage signal (Vdc) 102 supplied by an external DC-power supply device and received at a power management device. The signal 102 shares the same time axis as the signal 104, which represents the operational state of a DC-powered device. The state S1 is a non accepting operational state whereas state S2 is an accepting operational state. This figure illustrates some of the different operation modes of the DC-power supply device in relation with the operational state of the DC-powered device. A first operation mode is the so-called powered-device detection mode. This operation mode occurs in the time intervals ΔT1. In this example, and according to the current Power over Ethernet standard regulations, the time length of the voltage signal is shorter than 500 ms and the DC-voltage level is equal to or is lower than 10 volts. During these intervals ΔT1, the DC-power supply device is configured to detect a signature load indicative of a presence of a DC-powered device in an accepting operational state. As an example based on current Power over Ethernet standards, if the DC-power supply device detects a signature load comprising a resistive load between 19 kΩ and 27 kΩ with a parallel capacitance lower that 120 nF, the DC-power supply device is said to have detected a DC-powered device in an accepting operational state and proceeds with the next operation modes. If, on the contrary, the detected signature load differs (e.g. the DC-power supply device detects a very high resistive load indicative of an open circuit) the powered-device detection mode eventually ends after the time interval ΔT1 lapses and it is repeated after a predetermined time. For example, in standard Power over Ethernet technology, the powered-device detection mode is repeated once every second (i.e. with a frequency of 1 Hz). When the operational state of the DC-powered device is S2, i.e., the DC-powered device is in the accepting operational states, it presents to the DC-powers supply device the predetermined signature load. During a time interval ΔT1 following the change from S1 to S2, the DC-power supply device detects the signature load. If the DC-power supply device has detected a DC-powered device in an accepting operational state, it operates during time interval ΔT2 in the so called powered-device classification mode where it matches its power delivery capability with the power consumption needs of the DC-powered device, to determine a power classification. Once the DC-powered device has determined that it can provide the required power to the DC-powered device, it enters the powered-device operation mode (interval ΔT3) where it delivers to the DC-powered device the necessary DC-power for its operation.

Figure 2:
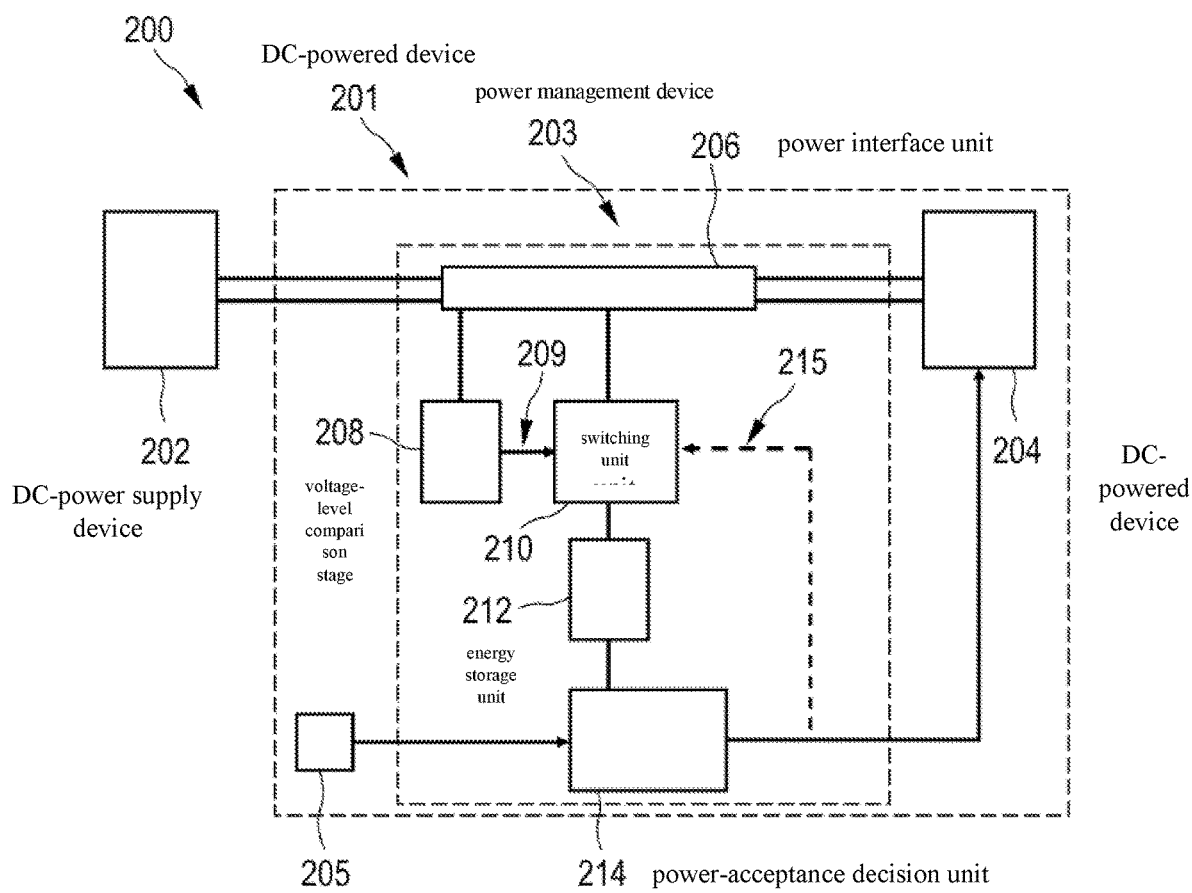
FIG. 2 shows an exemplary block diagram of an embodiment of an electrical arrangement.

FIG. 2 shows an exemplary block diagram of an embodiment of an electrical arrangement 200 comprising a DC-powered device arrangement 201 and a DC-power supply device 202. The DC-powered device arrangement 201 comprises a power management device 203, a DC-powered device 204 and a control unit 205. The power management device is configured to control a delivery of a DC-power from the DC-power supply device 202 to the DC-powered device 204. In this particular example, DC-power supply device is a Power Sourcing Equipment in the sense of Power over Ethernet technology, whereas the DC-powered device is a luminaire and the control unit is an infrared sensor configured to detect a movement of a user, e.g., a human being. The DC-powered device is operable, in accordance with a predetermined power-acceptance criterion, in either an accepting operational state or a non-accepting operational state with respect to receiving the DC-power from the DC-power supply device 202. The power management device 203 comprises a power interface unit 206 that is configured to receive DC input power from the DC-power supply device 202 and provide DC output power to the DC-powered device 204 in the accepting operational state of the external DC-powered device.

The power management device 200 also comprises a voltage-level comparison stage 208 connected to the power interface unit 206 and configured to deliver a switching control signal with a respective signal state indicative of whether or not a current voltage level of the DC-input power falls within a predetermined voltage range that is indicative of the DC-power supply device 202 operating in a powered-device detection mode and not in an powered-device operation mode. In reference to FIG. 1, the predetermined voltage range can be defined as having 2.8 volts as a lower voltage level limit and 10 volts as an upper voltage level limit, although other voltage ranges are defined for other power management devices.

A switching unit 210 is configured to receive the switching control signal 209 and to mutually connect the power interface unit 206 and an energy storage unit 212. This connection takes place when the signal state of the switching control signal indicates that the DC-power supply device is currently operating in the powered-device detection mode. The energy storage unit 212 is thus configured to store electrical energy currently received from the external DC-power supply 202 device via the power interface unit 206.

The power voltage-level comparison stage is further configured to determine if the current voltage level of the DC-power input is higher than an operational voltage threshold that is indicative of the DC-power supply device operating in the powered-device operation mode. This enables the power management device to determine if the DC-power supply device is operating in the powered-device operation mode, and in that case the switching unit is further configured to mutually connect the power interface unit and the energy storage.

Therefore, an electrical connection between the power interface unit and the energy storage unit is guaranteed while the DC-power supply device is operating in the powered-device detection mode and while it is operating in the powered-device operation mode.

The power management device further comprises a power-acceptance decision unit 214 which is configured to determine whether or not the power-acceptance criterion is fulfilled and, in case it is fulfilled, to provide a power-acceptance command for reception by the external DC-powered device 204 and indicative of an instruction to operate in the accepting operational state. In this particular embodiment the power-acceptance criterion depends on the current status of the external control unit 205, which in this exemplary embodiment is an infrared sensor. When the sensor determines that, based on changes of the sensed infrared radiation in reference to a background level, a user (e.g. a human being) is moving, it sends a wake-up signal to the power-acceptance decision unit 214, the wake up signal having an state indicative of the power-acceptance criterion being fulfilled. The power-acceptance decision unit 214 then provides a power-acceptance command that is to be received by the luminaire 204. The luminaire, in turn, upon reception of this command, changes its state from the non-accepting operational state to the accepting operational state. This is done by presenting a predetermined load signature that will be detected by the DC-power supply device and interpreted as a powered-device operating in an accepting operational state, and thus ready to receive DC-power for its operation. In some particularly simple embodiments, the presence of the power-acceptance command acts on an internal switch that closes a current loop between the DC-power source device and the DC-powered device.

Once in the accepting operational state, the luminaire 204 is configured to present the required signature load to be identified by the DC-power supply device 204 as a DC-powered device in an accepting operational state. The DC-powered device is in turn configured to determine the power classification and to deliver the required power to the DC-powered device.

In some examples of power management devices, the voltage-level comparison stage is only configured to determine if the DC-power supply device is operating in the powered-device detection mode and not in the power-device operation mode. In these examples, the power-acceptance command provided by the power-acceptance unit is also received by the switching unit as indicated by the dashed-line 215 and used to connect the power interface unit to the energy storage unit. This means that also during the operation of the DC-powered device in the accepting operational state, the switching unit 210 is configured to mutually connect the energy storage unit 212 and the power interface unit 206. This guarantees the delivery of power to the power-acceptance decision unit by enabling a charging path between the power interface unit 206 and the energy storage unit 212. In this particular example, the presence or absence of the power-acceptance command is used by the switching unit to further control its switching state, allowing energy to flow to and be stored in the energy storage unit while the DC-powered device is operating in the accepting operational state.

Some power management devices comprise a switching unit having a single switch being controlled by two different signals (e.g. the switching control signal and the power-acceptance command), while other power management devices comprise a switching unit including two different switches being controlled respectively by the switching control signal and the power-acceptance command.

Figure 3:
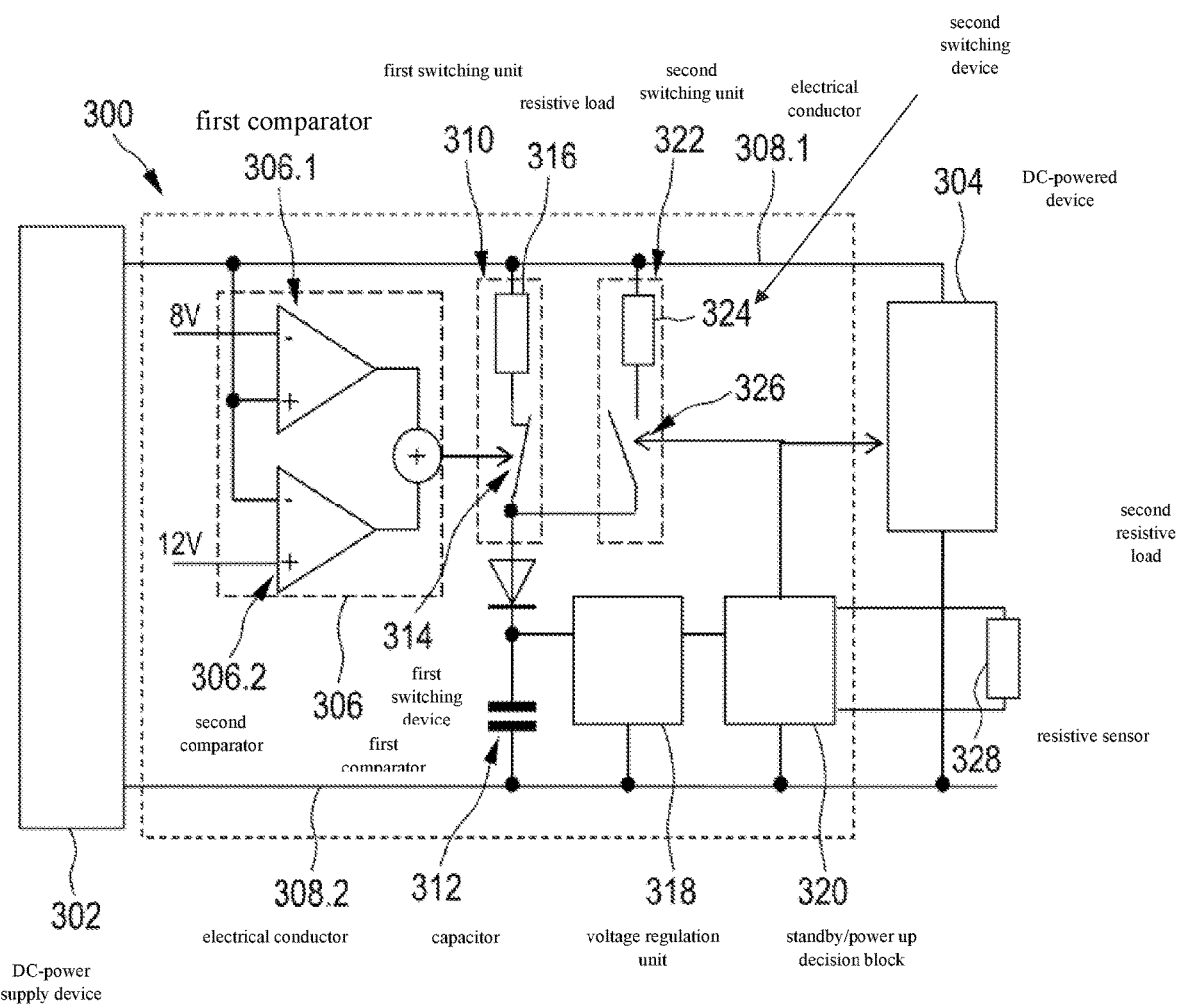
FIG. 3 shows a schematic diagram of an electrical circuit of an embodiment of a power management device.

FIG. 3 represents a schematic diagram of an electrical circuit of an embodiment of a power management device 300 for controlling a delivery of a DC-power from an external DC-power supply device 302 to an external DC-powered device 304. In this embodiment, the voltage-level comparison stage 306 is connected to the power interface unit, which comprises a pair of electrical conductors 308.1 and 308.2. The voltage-level comparison stage 306 comprises a first comparator 306.1 and a second comparator 306.2. Each comparator has a positive input and a negative input as indicated in the FIG. 3. The power interface unit is connected to the positive input of the first comparator and to the negative input of the second comparator. A first reference voltage amount of 8 volts is provided to the negative input of the first comparator and the second reference voltage amount of 12 volts is provided to the positive input of the second comparator. The values of the first reference voltage of the second reference voltage can be selected to define a voltage range which includes the voltage level indicative of the DC-power supply device operating in a powered-device detection mode.

The switching unit of this power management device includes a first switching unit 310 and a second switching unit 322 that are configured to electrically connect the power interface unit (i.e. the electrical conductor 308.1) to the capacitor 312 which, in this embodiment, serves as an energy storage unit configured to store electrical energy received from the external DC power supply via the power interface unit. The first switching unit 310 comprises a first switching device 314. This particular embodiment includes a resistive load 316 to limit the current flowing through the switching device 314 to the capacitor 312. The power management device further comprises a diode configured to prevent the flow of energy from the capacitor 312 towards the switching device 314. The power acceptance decision unit comprises, in this embodiment, a voltage regulation unit 318 that is configured to control the voltage supplied by the capacitor 312 and a standby/power up decision block 320 configured to determine whether or not the power acceptance criteria and is fulfilled and, in case it is fulfilled, to provide a power-acceptance command for reception by the external DC powered device. The supply of power to the power acceptance decision unit during the operation of the external DC powered supply in the accepting operational state is enabled by the second switching unit 322 which comprises a second switching device 324 and the second resistive load 326 to limit the current flowing through the switching device 324. In this embodiment the presence of the power acceptance command opens a second charging path that connects the capacitor 312 to the power interface unit. In this particular embodiment, the external control unit is a resistive sensor 328, which monitors the environmental light flux by means of a light dependent resistor. The output of this resistive sensor is used by the standby/power decision block 320 to evaluate whether or not the power-acceptance criterion is fulfilled. In other embodiments, other types of sensors can be used, such as thermal sensors, humidity sensors, infrared sensors, pressure sensors, etc. in other embodiments the state of a manual switch is used to evaluate the power-acceptance criterion. In other embodiments the state of an external timing device is used to evaluate the power-acceptance criterion.

Figure 4:
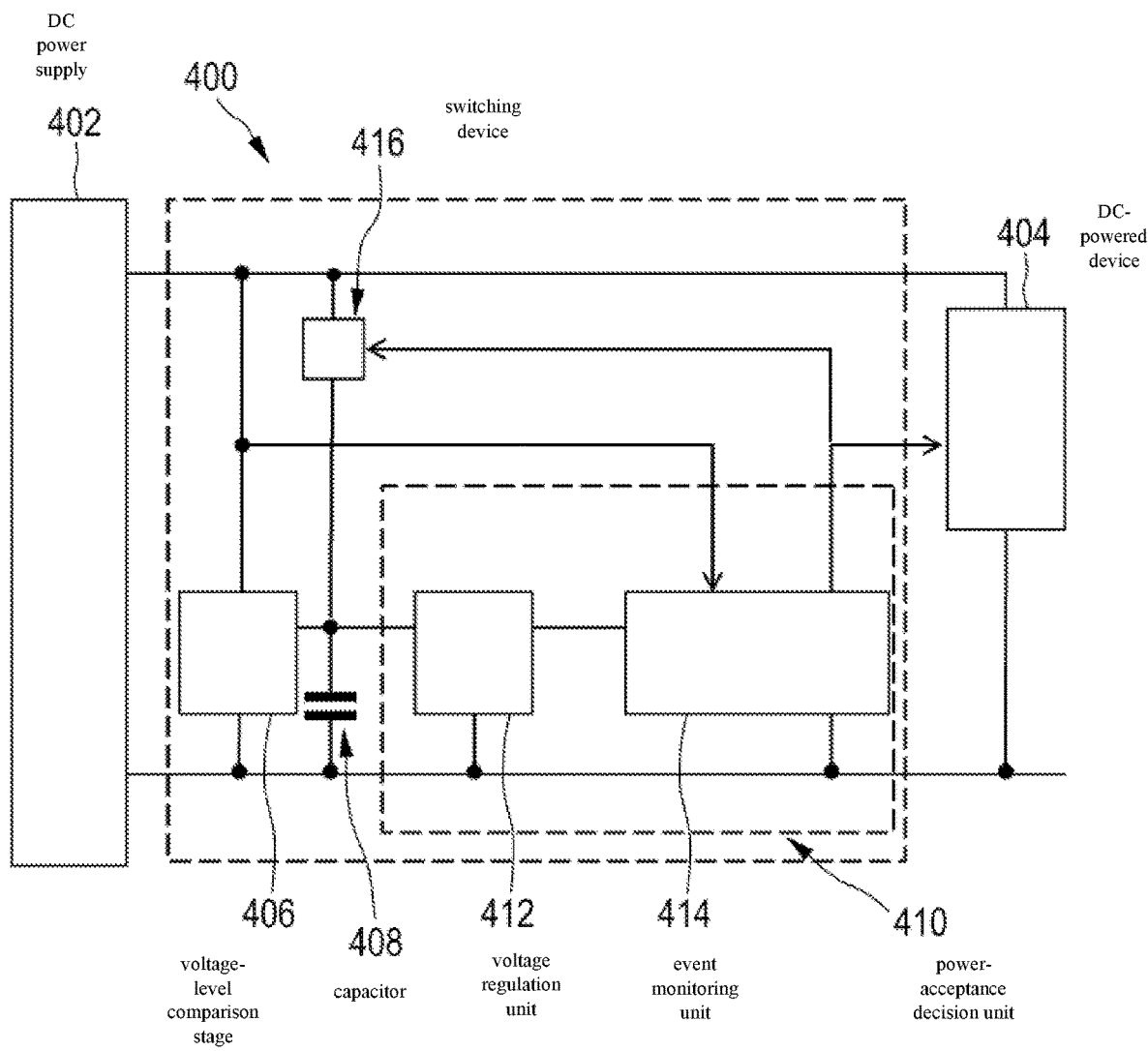
FIG. 4 shows a schematic block diagram of an embodiment of a power management device.

FIG. 4 shows a schematic block diagram of another embodiment of a power management device 400 for controlling the delivery of DC power from an external DC power supply 402 to an external DC powered device 404. The power management device 400 and the DC-powered device 404 form an example of a DC-powered device arrangement, and the power management device 400 together with the DC-powered device 404 and the DC-power supply device 402 form an example of an electrical arrangement. For the sake of simplicity the part of the switching unit that determines if the DC-power supply device is operating in the powered-device detection mode and the voltage-level comparison stage are represented by diagram block 406. The energy storage unit of the power management device 400 is a capacitor 408, which is configured to store electrical energy receive from the external DC-power supply device 402, and to power a power-acceptance decision unit 410 that in these embodiment encloses a voltage regulation unit 412 and an event monitoring unit 414. The event monitoring unit is powered by the electrical energy stored in the capacitor 408 and counts a number of occurrences of a predetermined event. In this particular embodiment, the event monitoring unit counts the number of times the DC-power supply devices provides a DC-input power indicative of operation in a powered-device identification mode (e.g., the pulses at intervals ΔT1 in FIG. 1) and determines that the power-acceptance criterion is fulfilled, when the counted number of occurrences reaches a predetermined threshold value. Therefore, this embodiment uses the DC-input power provided by the external DC-power supply device during operation in the powered-device detection mode as a clock that is used to trigger the fulfillment of the power-acceptance criterion after a predetermined number of occurrences have been counted, and thus the operation of the external DC-powered device in an accepting operational state. In some embodiments, the number of occurrences counted by the event monitoring unit is set back to zero after the power-acceptance command has been sent to the external DC-powered device 404. The power-acceptance command is also received by a switching device 416 that forms part of the switching unit of the power management device 400 and that is configured to connect the power interface unit to the capacitor 408 while the power-acceptance command is being received.

Figure 5:
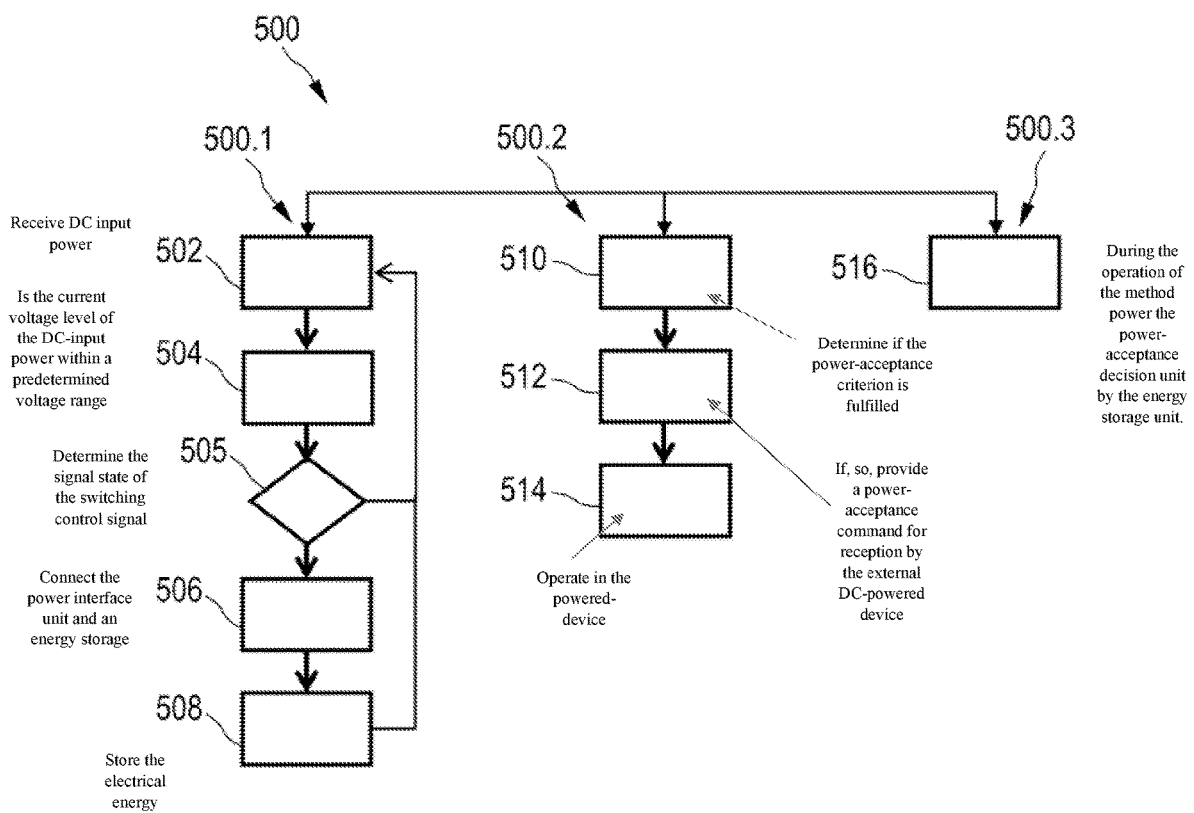
FIG. 5 shows an exemplary flow diagram of a method for operating a power management device

FIG. 5 shows a flow diagram of a method for operating a power management device in controlling a delivery of a DC-power from an external DC-power supply device to an external DC-powered device that is operable, in accordance with a predetermined power-acceptance criterion, in either an accepting operational state or a non-accepting operational state with respect to receiving the DC-power. The method comprises three different method routines 500.1, 500.2 and 500.3 that are carried out in parallel. In the first method routine the method monitors the DC input power received from the DC-power supply device and stores electrical energy in an energy storage unit in dependence of the DC input power. To that end, the method receives, in a step 502, DC input power from the external DC-power supply at a power interface unit. The DC-input power is a power signal having a voltage component and a current component. The actual DC-power input power depends on the current operation mode of the DC-power supply device. The method then delivers, in a step 504, a switching control signal with a respective signal state indicative of whether or not a current voltage level of the DC-input power falls within a predetermined voltage range that is indicative of the DC-power supply device operating in a powered-device detection mode and not in a powered-device operation mode. The method determines in a step 505 if the signal state of the switching control signal indicates that the DC-power supply device is currently operating in the powered-device detection mode and if this is the case, the method mutually connects, in a step 506 the power interface unit and an energy storage unit via a switching unit, and then stores, in a step 508, electrical energy currently received from the external DC-power supply device via the power interface unit. The method branches back to step 502 when step 505 does not determine that the signal state of the switching control signal indicates that the DC-power supply device is currently operating in the powered-device detection mode or after the energy has been stored.

Meanwhile, in the second method routine 500.2, the method determines, in a step 510, whether or not the power-acceptance criterion is fulfilled and, in case it is fulfilled, provides, in a step 512, a power-acceptance command for reception by the external DC-powered device and indicative of an instruction to operate in the accepting operational state and then mutually connects, in a step 514, the energy storage unit and the power interface unit via the switching unit when the external DC-power supply device is currently operating in the powered-device operation mode.

During the operation of the method, the method routine 500.3 in a step 516 may additionally or exclusively power the power-acceptance decision unit by the energy storage unit.

The first method routine 500.1 rules the operation of the power management device while the DC-power supply device does not operate in the powered-device operation mode.

The second method routine 500.2 rules the operation of the power management device while the DC-power supply device operated in the powered-device operation mode, and thus delivers power to the external DC-powered device.

The third method routine 500.3 states that the power-acceptance decision unit is exclusively powered by the energy stored in the energy storage unit While the present invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single step or other units may fulfill the functions of several items recited in the claims. The mere fact that certain measures are recited in mutually different dependent claims does not indicate that a combination of these measured cannot be used to advantage.

Any reference signs in the claims should not be construed as limiting the scope.

The invention claimed is:

1. A power management device for controlling a delivery of a DC-power from an external DC-power supply device, wherein the external DC-power supply device operates at least in a powered-device detection mode wherein the external DC-power supply device detects whether an external DC-powered device is connected, and in a powered-device operation mode wherein the external DC-power supply device provides DC-power to the external DC-powered device, the power management device comprising:
   a power interface unit configured to receive DC input power from the external DC-power supply device and provide DC output power to the external DC-powered device in an accepting operational state of the external DC-powered device, wherein the external DC-powered device is operable, in accordance with a predetermined power-acceptance criterion, in either the accepting operational state wherein the external DC-powered device is detectable and receives DC power from the external DC-power supply device or a non-accepting operational state, wherein the external DC-powered device is not detectable during the operation in the powered-device detection mode;
   a power-acceptance decision unit which is configured to determine whether or not the power-acceptance criterion is fulfilled and, in case it is fulfilled, to provide a power-acceptance command to the external DC-powered device and indicative of an instruction to operate in the accepting operational state;
   a voltage-level comparison stage connected to the power interface unit and configured to deliver a switching control signal with a respective signal state indicative of a DC-voltage amount currently supplied by the external DC-power supply device;
   a switching unit, which is configured to receive the switching control signal and to mutually connect, when the signal state of the switching control signal indicates that the DC-power supply device is currently operating in the powered-device detection mode or in the powered-device operation mode, the power interface unit and an energy storage unit that is configured to store electrical energy currently received from the external DC-power supply device via the power interface unit.

2. The power management device of claim 1, wherein the voltage-level comparison stage is additionally configured to determine if the current voltage level of the DC-power input is higher than an operational voltage threshold that is indicative of the external DC-power supply device operating in the powered-device operation mode; and wherein
   the switching unit is further configured to mutually connect the power interface unit and the energy storage unit when switching control signal is indicative of the current voltage level of the DC-power input being higher than the operational voltage threshold.

3. The power management unit of claim 1, wherein the switching unit is further configured to receive the power-acceptance command and to mutually connect the power interface unit and the energy storage unit upon receiving the power-acceptance command.

4. The power management device of claim 1, wherein, when the power-acceptance criterion is not currently fulfilled, the power-acceptance decision unit is further configured to provide a power-discontinuation command for reception by the external DC-powered device and indicative of an instruction to operate in the non-accepting operational state.

5. The power management device of claim 1, wherein
   DC-input power having a current voltage amount belonging to a predetermined voltage range is indicative of the external DC-power supply device operating in the powered-device detection mode; and wherein
   the predetermined voltage range extends between a first reference voltage forming a lower limit and a second reference voltage forming an upper limit of the voltage range, and wherein voltage-level comparison stage comprises a first comparator configured to determine whether the current voltage level of the DC-input power is higher than the first reference voltage, and a second comparator configured to determine whether the current voltage level of the DC-input power is lower than a second reference voltage.

6. The power management device of claim 5, each of the first and second comparators has a positive input and a negative input, and wherein the power interface unit is connected to the positive input of the first comparator and to the negative input of the second comparator, the first reference voltage is provided to the negative input of the first comparator and the second reference voltage is provided to the positive input of the second comparator.

7. The power management device of claim 6, wherein the first reference voltage amount is equal to or higher that 8 volts and the second reference voltage amount is equal to or lower than 12 volts.

8. The power management device of claim 1, wherein the power-acceptance decision unit is further configured to receive a wake-up signal from an external control unit and to determine whether or not the power-acceptance criterion is fulfilled in dependence on a signal state of the wake-up signal.

9. The power management device of claim 1, wherein the power-acceptance decision unit comprises an event monitoring unit connected to the power interface unit and configured to count a number of occurrences of a predetermined event, and wherein the power-acceptance criterion is fulfilled when the counted number of occurrences reaches a predetermined threshold amount.

10. The power management device of claim 1, wherein the power management device is powered exclusively by the energy storage unit.

11. A method for operating a power management device in controlling a delivery of a DC-power from an external DC-power supply device to an external DC-powered device, wherein the external DC-power supply device operates at least in a powered-device detection mode wherein the external DC power supply device detects whether the external DC-powered device is connected, and in a powered device operation mode wherein the external DC-power supply device provides DC-power to the external DC-powered device, the method comprising:
   receiving DC input power from the external DC-power supply;
   determining whether or not the power-accepting criterion is fulfilled and, in case it is fulfilled, providing a power-acceptance command to the external DC-powered device and indicative of an instruction to operate in the accepting operational state, wherein the external DC-powered device is operable, in accordance with a pre-determined power-acceptance criterion in either the accepting operational state wherein the external DC-powered device is detectable and receives DC power from the external DC-power supply device or a non-accepting operational state, wherein the external DC-powered device is not detectable during the operation in the powered-device mode;

delivering a switching control signal with a respective signal state indicative of whether or not a current voltage level of the DC-input power falls within a predetermined voltage range that is indicative of the external DC-power supply device operating in a powered-device detection mode and not in a powered-device operation mode;

providing, when the signal state of the switching control signal indicates that the external DC-power supply device is currently operating in the powered-device detection mode, the DC input power to an energy storage unit;

storing electrical energy currently received from the external DC-power supply device in the energy storage unit;

mutually connecting, via the switching unit, the energy storage unit and the power interface unit when the external DC-power supply device is currently operating in the powered-device operation mode.

\* \* \* \* \*